(12) United States Patent
Takano et al.

(10) Patent No.: US 8,320,851 B2
(45) Date of Patent: Nov. 27, 2012

(54) WIRELESS COMMUNICATION DEVICE, WIRELESS COMMUNICATION METHOD, AND COMPUTER PROGRAM

(75) Inventors: Hiroaki Takano, Saitama (JP); Seiichi Izumi, Kanagawa (JP); Shinichi Kuroda, Tokyo (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 12/492,679

(22) Filed: Jun. 26, 2009

(65) Prior Publication Data

US 2010/0026561 A1 Feb. 4, 2010

(30) Foreign Application Priority Data

Jul. 30, 2008 (JP) ................................. 2008-195886

(51) Int. Cl.
- *H01Q 11/12* (2006.01)
- *H04B 1/04* (2006.01)
- *H04B 1/38* (2006.01)
- *H04M 1/00* (2006.01)
- *H04L 5/16* (2006.01)

(52) U.S. Cl. .................. 455/114.2; 455/550.1; 455/120; 375/220; 375/221

(58) Field of Classification Search .................. 455/63.1, 455/67.11, 67.13, 67.16, 73, 77, 550.1, 553.1, 455/114.2, 120, 296; 375/220, 221
See application file for complete search history.

(56) References Cited

U.S. PATENT DOCUMENTS

| | | | | |
|---|---|---|---|---|
| 6,600,445 B2 * | 7/2003 | Li | ................................. | 342/368 |
| 2002/0118771 A1 * | 8/2002 | Larsson | ........................ | 375/267 |
| 2003/0032423 A1 * | 2/2003 | Boros et al. | .................... | 455/423 |
| 2004/0095907 A1 * | 5/2004 | Agee et al. | ...................... | 370/334 |
| 2004/0162021 A1 * | 8/2004 | Seki et al. | ......................... | 455/39 |
| 2007/0025474 A1 * | 2/2007 | Moorti et al. | ................... | 375/329 |
| 2007/0053451 A1 * | 3/2007 | French et al. | ................. | 375/260 |
| 2010/0222011 A1 * | 9/2010 | Behzad | ........................... | 455/77 |

FOREIGN PATENT DOCUMENTS

| | | |
|---|---|---|
| JP | 2002-135033 | 5/2002 |
| JP | 2002-261668 | 9/2002 |
| JP | 2003-522445 | 7/2003 |
| JP | 2007-116489 | 5/2007 |

* cited by examiner

*Primary Examiner* — Andrew Wendell
(74) *Attorney, Agent, or Firm* — Oblon, Spivak, McClelland, Maier & Neustadt, L.L.P.

(57) ABSTRACT

A wireless commutation device includes: an antenna unit including antennas transmitting and receiving wireless signals; an analog processing unit including transmitting analog circuits and receiving analog circuits processing analog transmitting and received signals; a digital processing unit processing digital transmitting and received signals; an inter-antenna propagation loss determination unit determining propagation losses between the antennas; a loopback transfer function gain acquisition unit acquiring, through loopback of a calibration signal between the antennas, gains of loopback transfer functions between antenna branches; a loopback transfer function gain correction unit correcting the gains by using the propagation losses; a correction coefficient determination unit determining the respective gain ratios among the receiving analog circuits and the transmitting analog circuits by using the corrected gains, and determining correction coefficients by using the gain ratios; and a gain calibration processing unit performing gain calibration on the digital transmitting and received signals by using the correction coefficients.

9 Claims, 12 Drawing Sheets

ANTENNA 0

ANTENNA 1

ANTENNA 2

WIRELESS COMMUNICATION DEVICE, WIRELESS COMMUNICATION METHOD, AND COMPUTER PROGRAM

BACKGROUND OF THE INVENTION

1. Field of the Invention

The present invention relates to a wireless communication device, a wireless communication method, and a computer program including a plurality of antennas and performing calibration processing to compensate for the imbalance among antenna branches, particularly to a wireless communication device, a wireless communication method, and a computer program for performing calibration processing by looping back a calibration signal between antenna branches.

More in detail, the present invention relates to a wireless communication device, wireless communication method, and a computer program for performing calibration processing to guarantee that transmitting analog circuits and receiving analog circuits of the respective antenna branches have a constant amplitude, particularly to a wireless communication device, wireless communication method, and a computer program for performing gain calibration processing to make transmitting analog circuits and receiving analog circuits of the respective antenna branches have a constant amplitude by the use of a small number of loopback paths.

2. Description of the Related Art

As a system releasing users from wiring according to an existing wired communication method, a wireless network has been drawing attention. Normal standards relating to the wireless network include IEEE (The Institute of Electrical and Electronics Engineers) 802.11 and IEEE 802.15. The IEEE 802.11a/g standard supports a modulation method achieving a maximum communication speed of 54 Mbps. A next-generation wireless LAN (Local Area Network) standard capable of achieving a higher bit rate has been sought.

Wireless communication technologies achieving high-throughput wireless data transmission include multi-antenna technology, according to which a communication device includes a plurality of antennas. As an example of the multi-antenna technology, an adaptive array antenna is in wide use. This is a method of controlling the gains of respective antenna elements to obtain appropriate antenna directivity in transmission and reception and support communication. That is, signals received by the respective antenna elements are multiplied by respective appropriate weighting factors for weighted synthesis, and the reception directivity pattern of the entire array antenna is controlled. Further, respective transmitting signals are multiplied by appropriate weighting factors for the respective antenna elements, and are transmitted from the respective antenna elements. Thereby, the transmission directivity pattern of the entire array antenna is controlled. The array antenna method includes a sector antenna-like method in which a main lobe is directed only in a desired direction and a low side lobe is directed in an undesired direction to prevent unnecessary radio wave radiation, and a method in which a main lobe is directed in the direction of a desired mobile station and a null is directed in the direction of a mobile station acting as an interfering station to improve the SINR (Signal-to-Interference-plus-Noise power Ratio).

Further, as another example of the wireless communication technology using the multi-antenna, MIMO (Multi-Input Multi-Output) communication has been drawing attention. The MIMO achieves higher-quality communication by performing beamforming between a transmitter (beamformer) and a receiver (beamformee), each of which includes a plurality of antenna elements. The beamforming herein refers to a method of digitally weighting respective transmitting antennas and changing the antenna directivity to achieve high-quality reception by the receiver. The transmitting antenna weighting can be obtained through the analysis of a channel matrix H in the forward direction from the transmitter to the receiver. The MIMO communication method can achieve an increase in the communication speed by increasing the transmission capacity in accordance with the number of antennas, without increasing the frequency band. Further, the method uses spatial multiplexing, and thus improves the frequency use efficiency. The MIMO is a communication method using the channel characteristic, and is different from the transmitting and receiving adaptive array. For example, IEEE 802.11n, which is an extended standard of IEEE 802.11, employs the MIMO communication method.

In any of the multi-antenna technologies, there is an issue of variation in characteristic among transmitting and receiving antenna branches (characteristic of the space between one antenna branch and another antenna branch). That is, there is an issue in that, in the transmission of an RF (Radio Frequency) signal through an RF transmitting circuit or an RF receiving circuit, the influence of individual differences of active devices and components forming the circuit, such as an amplifier and frequency converters (an up-converter used in the transmission and a down-converter used in the reception), appears as the imbalance in phase and amplitude among antenna branches. Particularly, individual differences of an AGC (Automatic Gain Control) circuit in the RF receiving circuit and a PA (Power Amplifier) in the RF transmitting circuit have a significant influence.

The method of correcting the variation in characteristic among transmitting and receiving antenna branches can be roughly divided into "antenna calibration" and "IQ (In-phase, Quadrature) calibration."

The phase and amplitude characteristics of an analog circuit included in each of the antenna branches are referred to as a "transfer function." The antenna calibration corresponds to adjustment for maintaining a constant ratio between the transfer function of a transmitting analog circuit and the transfer function of a receiving analog circuit in each of the branches. The imbalance in transfer function among branches leads to the deterioration of the antenna characteristic in the adaptive array, and directivity different from the expected directivity is formed. Further, in the MIMO communication, the imbalance in phase and amplitude among branches leads to false channel recognition, and prevents the acquisition of an appropriate transmission beamforming matrix. As a result, the decoding characteristic of the receiver is significantly deteriorated.

For example, a proposal has been made of a wireless communication device which calculates accurate antenna calibration coefficients for respective branches on the basis of forward loopback transfer functions of paths for transmitting a known calibration signal from a reference branch, which is one of the transmitting and receiving branches, to the other branches, and backward loopback transfer functions of paths looped back from the other branches and having the known calibration signal received by the reference branch (see Japanese Unexamined Patent Application Publication No. 2007-116489, for example).

Meanwhile, the IQ calibration intends to correct an IQ amplitude error attributed to the variation in amplitude of I (In-phase) channel signals and Q (Quadrature) channel signals in an IQ modulator of the up-converter and an IQ demodulator of the down-converter, and to correct an IQ phase error indicating a shift of the I-axis and the Q-axis from the angle of 90°. If an IQ error formed by the IQ amplitude error and the IQ phase error is not corrected, the EVM (Error Vector Magnitude) of a transmitted signal and a received signal is deteriorated. As a result, the communication quality is deteriorated.

In the past, neither one of the antenna calibration and the IQ calibration has provided the effect of equalizing the amplitudes of the respective antenna branches.

The antenna calibration basically intends to maintain a constant ratio between the transmission analog transfer function and the reception analog transfer function in each of the antennas. Therefore, the antenna calibration does not satisfy the following two conditions at all.

First Condition: The amplitudes of the transmitting analog circuits of the respective antenna branches are constant.

Second Condition: The amplitudes of the receiving analog circuits of the respective antenna branches are constant.

Further, the IQ calibration adjusts the I-channel amplitude and the Q-channel amplitude to be equal in one antenna, but does not adjust the amplitudes of the respective antennas.

Herein, consideration will be given to an issue arising when the transmitting analog circuits and the receiving analog circuits of the respective antenna branches do not have a constant amplitude, i.e., when the first and second conditions described above are not met.

If the first condition is not met, i.e., if the amplitudes of the transmitting analog circuits of the respective antenna branches are not constant, waste occurs in the determination of the transmission power. For example, if the standard specifies the transmission with a power of 0 dBm (1 mW), and if there is variation in amplitude among the transmitting antennas of a communication device, i.e., if there is variation in transmission power, the transmission power is set to be lower than 0 dBm (1 mW) to meet the standard in consideration of the variation among devices. As a result, a power loss occurs, and communication with another party is prevented when the transmitted signal is supposed to reach the party.

Further, if any one of the first and second conditions is not met, the use of normal AGC or the like is prevented in many cases in the calibration for compensating for the IQ imbalance, due to the loopback in a device. In such a case, a calibration signal is monitored with the gain of the AGC (Automatic Gain Control) fixed. If the respective antennas have different amplitudes, the dynamic range is restricted due to the absence of the AGC. As a result, the number of bits used in the device (an ADC (Analog-to-Digital Converter) circuit and the subsequent stages) is increased.

In sum, it is considered significantly important to perform gain calibration satisfying the first and second conditions described above.

SUMMARY OF THE INVENTION

It is desirable in the present invention to provide a superior wireless communication device, wireless communication method, and computer program including a plurality of antennas and capable of suitably performing calibration processing to compensate for the imbalance among antenna branches by looping back a calibration signal between the antenna branches.

It is further desirable in the present invention to provide a superior wireless communication device, wireless communication method, and computer program capable of suitably performing calibration processing to guarantee that transmitting analog circuits and receiving analog circuits of the respective antenna branches have a constant amplitude.

It is further desirable in the present invention to provide a superior wireless communication device, wireless communication method, and computer program capable of performing gain calibration processing to make transmitting analog circuits and receiving analog circuits of the respective antenna branches have a constant amplitude by the use of a small number of loopback paths.

A wireless communication device according to an embodiment of the present invention includes an antenna unit, an analog processing unit, a digital processing unit, inter-antenna propagation loss determination means, loopback transfer function gain acquisition means, loopback transfer function gain correction means, correction coefficient determination means, and gain calibration processing means. The antenna unit is configured to include a plurality of antennas for transmitting and receiving wireless signals. The analog processing unit is configured to include receiving analog circuits and transmitting analog circuits corresponding to the respective plurality of antennas, and to process analog transmitting and received signals. The digital processing unit is configured to process digital transmitting and received signals corresponding to the respective plurality of antennas. The inter-antenna propagation loss determination means determines propagation losses between the respective antennas. The loopback transfer function gain acquisition means acquires, through loopback of a calibration signal between the respective antennas, gains of loopback transfer functions between respective antenna branches. The loopback transfer function gain correction means corrects, on the basis of the propagation losses between the respective antenna branches determined by the inter-antenna propagation loss determination means, the acquired gains of the loopback transfer functions between the respective antenna branches. The correction coefficient determination means determines, with the use of the gains of the loopback transfer functions between the respective antenna branches corrected by the loopback transfer function gain correction means, the gain ratio among the receiving analog circuits of the respective antenna branches and the gain ratio among the transmitting analog circuits of the respective antenna branches, and determines, on the basis of the gain ratios, correction coefficients for performing gain calibration on the digital transmitting and received signals corresponding to the respective plurality of antennas. The gain calibration processing means performs, with the use of the correction coefficients for the respective antennas determined by the correction coefficient determination means, the gain calibration on the digital transmitting and received signals corresponding to the respective plurality of antennas.

Further, in the wireless communication device according to an embodiment of the present invention, the inter-antenna propagation loss determination means may determine the propagation losses between the respective antennas on the basis of free-space propagation losses according to the distances between the respective antennas.

Further, in the wireless communication device according to an embodiment of the present invention, the inter-antenna propagation loss determination means may determine the propagation losses between the respective antennas on the basis of the result of measurement using a measuring device.

Further, in the wireless communication device according to an embodiment of the present invention, the inter-antenna propagation loss determination means may determine the propagation losses between the respective antennas to be equal by having respective antenna elements arranged at equal distances from one another.

Further, in the wireless communication device according to an embodiment of the present invention, the loopback transfer function gain acquisition means may acquire the gains of the loopback transfer functions in the respective receptions by the antennas other than a first antenna with the transmission from the first antenna used as a reference, the gains of the loopback transfer functions in the respective receptions by the antennas other than a second antenna different from the first antenna with the transmission from the second antenna used as a reference, the gains of the loopback transfer functions in the respective transmissions from the antennas other than the first antenna with the reception by the first antenna used as a reference, and the gains of the loopback transfer functions in the respective transmissions from the antennas other than the second antenna different from the first antenna with the reception by the second antenna used as a reference (wherein the antenna unit is assumed to include three or more antennas). Accordingly, the correction coefficient determination means can determine the accurate correction coefficients on the basis of the gains of the respective loopback transfer functions subjected to the correction with the space propagation losses.

Further, in the wireless communication device according to an embodiment of the present invention, the correction coefficient determination means may determine the maximum value from the gain ratio among the receiving analog circuits of the respective antenna branches, and determine a value resulting from subtraction of the gain of each of the receiving analog circuits from the maximum value to be the correction coefficient for the digital received signal of the corresponding antenna branch. Further, the correction coefficient determination means may determine the maximum value from the gain ratio among the transmitting analog circuits of the respective antenna branches, and determine a value resulting from subtraction of the gain of each of the transmitting analog circuits from the maximum value to be the correction coefficient for the digital transmitting signal of the corresponding antenna branch.

Further, a wireless commutation method according to an embodiment of the present invention is a wireless commutation method of a wireless commutation device. The wireless commutation device includes: an antenna unit configured to include a plurality of antennas for transmitting and receiving wireless signals; an analog processing unit configured to include receiving analog circuits and transmitting analog circuits corresponding to the respective plurality of antennas, and to process analog transmitting and received signals; and a digital processing unit configured to process digital transmitting and received signals corresponding to the respective plurality of antennas. The wireless communication method includes the steps of: determining propagation losses between the respective antennas; acquiring, through loopback of a calibration signal between the respective antennas, gains of loopback transfer functions between respective antenna branches; correcting, on the basis of the propagation losses between the respective antenna branches determined at the step of determining the propagation losses between the antennas, the acquired gains of the loopback transfer functions between the respective antenna branches; determining, with the use of the gains of the loopback transfer functions between respective antenna branches corrected at the step of correcting the gains of the loopback transfer functions, the gain ratio among the receiving analog circuits of the respective antenna branches and the gain ratio among the transmitting analog circuits of the respective antenna branches, and determining, on the basis of the gain ratios, correction coefficients for performing gain calibration on the digital transmitting and received signals corresponding to the respective plurality of antennas; and performing, with the use of the correction coefficients for the respective antennas determined at the step of determining the correction coefficients, the gain calibration on the digital transmitting and received signals corresponding to the respective plurality of antennas.

Further, a computer program according to an embodiment of the present invention is a computer program described in a computer-readable format to execute, on a computer, processing for adjusting the amplitudes of transmitting and received signals among respective antenna branches in a wireless commutation device. The wireless commutation device includes: an antenna unit configured to include a plurality of antennas for transmitting and receiving wireless signals; an analog processing unit configured to include receiving analog circuits and transmitting analog circuits corresponding to the respective plurality of antennas, and to process analog transmitting and received signals; and a digital processing unit configured to process digital transmitting and received signals corresponding to the respective plurality of antennas. The computer program causes the computer to function as: inter-antenna propagation loss determination means for determining propagation losses between the respective antennas; loopback transfer function gain acquisition means for acquiring, through loopback of a calibration signal between the respective antennas, gains of loopback transfer functions between the respective antenna branches; loopback transfer function gain correction means for correcting, on the basis of the propagation losses between the respective antenna branches determined by the inter-antenna propagation loss determination means, the acquired gains of the loopback transfer functions between the respective antenna branches; correction coefficient determination means for determining, with the use of the gains of the loopback transfer functions between the respective antenna branches corrected by the loopback transfer function gain correction means, the gain ratio among the receiving analog circuits of the respective antenna branches and the gain ratio among the transmitting analog circuits of the respective antenna branches, and determining, on the basis of the gain ratios, correction coefficients for performing gain calibration on the digital transmitting and received signals corresponding to the respective plurality of antennas; and gain calibration processing means for performing, with the use of the correction coefficients for the respective antennas determined by the correction coefficient determination means, the gain calibration on the digital transmitting and received signals corresponding to the respective plurality of antennas.

The computer program according to an embodiment of the present invention defines a computer program described in a computer-readable format to execute predetermined processing on a computer. In other words, with the computer program according to an embodiment of the present invention installed into a computer, a cooperative action is exhibited on the computer. Accordingly, action and effects similar to those of the wireless communication device according to an embodiment of the present invention can be obtained.

The present invention can provide a superior wireless communication device, wireless communication method, and computer program capable of suitably performing calibration processing to guarantee that transmitting analog circuits and receiving analog circuits of respective antenna branches have a constant amplitude.

In the wireless communication device, the wireless communication method, and the computer program according to an embodiment of the present invention, the loopback transfer function gain acquisition means acquires the gains of the loopback transfer functions between the respective antenna branches not though the in-device loopback but through the inter-antenna loopback. In the calibration processing, therefore, the isolation among the respective antenna branches can be improved. As a result, the accuracy of the acquisition of the coefficients for the antenna calibration and the IQ calibration can be improved.

Further, in the wireless communication device, the wireless communication method, and the computer program according to an embodiment of the present invention, the spatial transfer functions, which constitute uncertainty factors in the inter-antenna loopback, are corrected on the basis of the propagation losses between the respective antenna branches. With the use of the corrected gains of the loopback transfer functions between the respective antenna branches, therefore, more accurate gain calibration coefficients can be calculated. Accordingly, it is possible to guarantee that the amplitudes of the transmitting analog circuits of the respective antenna branches and the amplitudes of the receiving analog circuits of the respective antenna branches are both constant. As a result, the transmission power according to the standard can be output without waste, and the communication quality is improved. Further, the dynamic gain handled in the calibration processing is reduced, and the hardware size can be reduced.

Other purposes, characteristics, and advantages of the present invention will be made clear by more detailed description based on embodiments of the present invention described later and the attached drawings.

DESCRIPTION OF THE PREFERRED EMBODIMENTS

Figure 1:
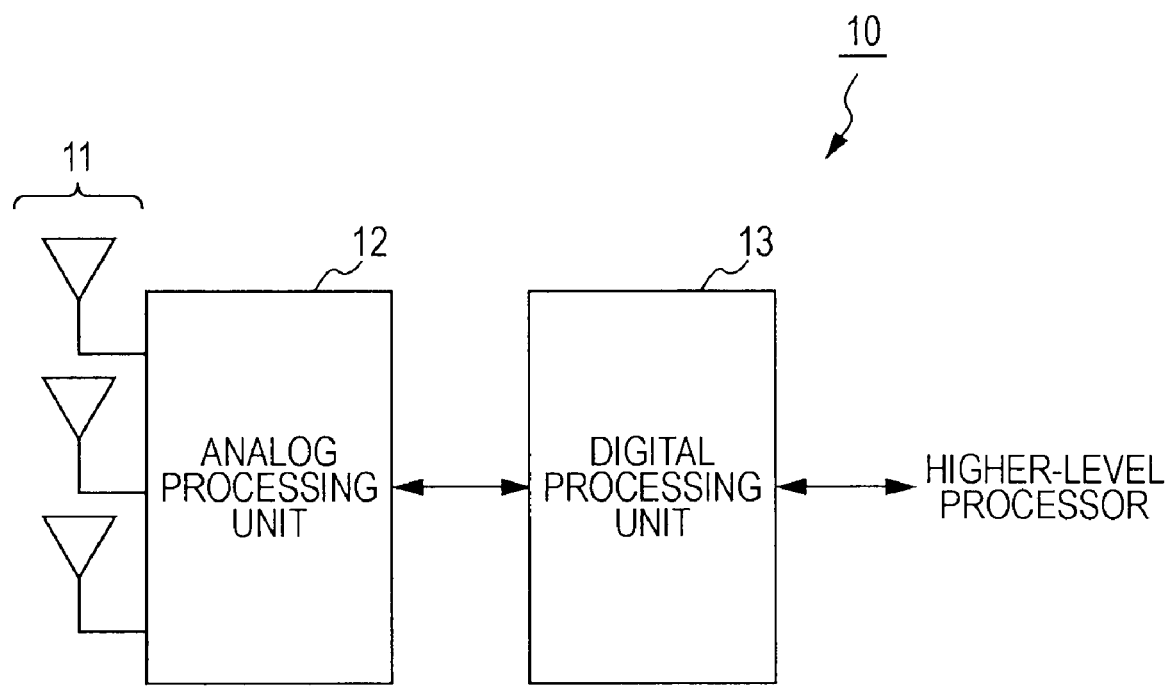
FIG. 1 is a diagram schematically illustrating a configuration of a wireless communication device according to an embodiment of the present invention.

Embodiments of the present invention will be described in detail below with reference to the drawings.

In multi-antenna technologies represented by an adaptive array and MIMO, there is an issue of variation in characteristic among transmitting and receiving branches. The method of correcting the variation in characteristic among transmitting and receiving branches can be roughly divided into "antenna calibration" and "IQ calibration." The respective calibration methods will be first described.

The phase and amplitude characteristics of an analog circuit included in each of the antenna branches are referred to as a "transfer function." As shown in the following formula, the antenna calibration corresponds to adjustment for maintaining a constant ratio between the transfer function of a transmitting analog circuit and the transfer function of a receiving analog circuit in each of the branches (in the present specification, the term "antenna branch" refers to an antenna and an analog circuit attached thereto).

Formula 1

$$\frac{T_x(0) \times K(0)}{R_x(0)} = \frac{T_x(1) \times K(1)}{R_x(1)} = \frac{T_x(2) \times K(2)}{R_x(2)} \quad (1)$$

The antenna calibration method can be roughly divided into, for example, out-of-device calibration (or pairwise calibration in which calibration is performed by packet-switching between two terminals) and in-device calibration (or self-calibration using the loopback of a calibration signal between antennas of one terminal (or in a device)). In both of the calibration methods, a received calibration signal and an original known calibration signal are compared with each other to detect the variations in characteristic of respective transmitting and receiving systems including antennas and transmission paths, and calibration coefficients are calculated on the basis of the detected variations.

In the out-of-device calibration, a calibration antenna is used as well as the array antenna, and a reference signal looped back through the transmission path is received. Therefore, there is an issue of susceptibility to the surrounding environment and the signal-to-noise ratio. In view of this, the present inventors consider that the self-calibration, which completes the calibration within a communication device, is preferable.

Herein, with reference to an example of a wireless communication device including three transmitting and receiving branches, description will be made of processing of performing the self-calibration to calculate the correction coefficients for compensating for the imbalance in phase and amplitude among the branches. In the description, i represents the branch number of an antenna, and $T_x(i)$ represents the transfer function of a transmitting analog unit included in the i-th branch. Further, $R_x(i)$ represents the transfer function of a receiving analog unit included in the i-th branch, and $K(i)$ represents the calibration coefficient serving as the correction value for the i-th branch.

In the self-calibration, a calibration signal is looped back in a communication device having a multi-antenna, to thereby calculate the calibration coefficient. A loopback transfer function obtained through a path from a transmitting branch i to a receiving branch j is represented as D(i,j). For example, when the calibration is performed with the 0-th transmitting and receiving branch (Branch 0) set as a reference branch, the loopback transfer functions of (forward) paths for transmitting a calibration signal from Branch 0 to the other Branches 1 and 2 and the loopback transfer functions of (backward) paths looped back from the other Branches 1 and 2 and having a calibration signal received by Branch 0 are calculated, as shown in the following formula.

Formula 2

$$D(0,1) = T_x(0) \times R_x(1)$$

$$D(0,2) = T_x(0) \times R_x(2)$$

$$D(1,0) = T_x(1) \times R_x(0)$$

$$D(2,0) = T_x(2) \times R_x(0) \quad (2)$$

When the calibration coefficient K(0) for Branch 0 serving as the reference branch is represented as a reference value, i.e., 1.0, the respective calibration coefficients for Branches 0 to 2 are represented as follows.

Formula 3

$$K(0) = 1.0 \quad (3)$$
$$K(1) = \frac{D(0,1)}{D(1,0)} = \left\{\frac{R_x(1)}{T_x(1)}\right\} \times \left\{\frac{R_x(0)}{T_x(0)}\right\}$$
$$K(2) = \frac{D(0,2)}{D(2,0)} = \left\{\frac{R_x(2)}{T_x(2)}\right\} \times \left\{\frac{R_x(0)}{T_x(0)}\right\}$$

If verification calculation is performed to check the validity of the above formula (1), it is understood, as shown in the following formula (4), that the calibration conditions are met in which the ratio between the transfer function of the transmitting analog unit and the transfer function of the receiving analog unit in each of the branches is constant.

Formula 4

$$\frac{T_x(0) \times K(0)}{R_x(0)} = \frac{T_x(0)}{R_x(0)} \quad (4)$$
$$\frac{T_x(1) \times K(1)}{R_x(1)} = \frac{T_x(0)}{R_x(0)}$$
$$\frac{T_x(2) \times K(2)}{R_x(2)} = \frac{T_x(0)}{R_x(0)}$$

The calibration is performed with the 0-th branch as the reference. Therefore, the calibration coefficient K(0) for the 0-th branch is 1.0, as shown in the above formula (3). Further, in the calibration coefficient K(i) for the other branches, a value {Tx(0)/Rx(0)} of the 0-th branch is commonly multiplied.

Subsequently, the IQ calibration method will be described.

The IQ calibration is performed antenna by antenna. The IQ error of the transmission system is first corrected. The sine wave of the F-tone frequency is transmitted as a reference signal, and the signal processed by a transmitting IQ modulator and square-law detected is monitored by a digital unit of the reception system. Thereby, a power having a frequency approximately twice the F-tone frequency is monitored in the frequency range. Accordingly, the magnitude of the transmission IQ error can be detected. The correction coefficient can be determined by a digital unit of the transmission system to reduce an error power.

Meanwhile, as for the reception IQ error, the since wave of the F-tone frequency is transmitted by the transmission system in a state in which the transmission IQ error has been corrected in the above-described manner. Then, the output from the transmitting IQ modulator is inserted into the input of a receiving IQ demodulator by the in-device loopback. Then, the digital unit monitors a power having a frequency close to the F-tone frequency multiplied by −1 in the frequency range. Thereby, the magnitude of the reception IQ error can be monitored. Then, the digital unit of the reception system can determine the correction coefficient to reduce an error power.

Neither one of the antenna calibration and the IQ calibration described above guarantees the following two conditions.

First Condition: The amplitudes of the transmitting analog circuits of the respective antenna branches are constant.

Second Condition: The amplitudes of the receiving analog circuits of the respective antenna branches are constant.

If the amplitudes of the transmitting analog circuits of the respective antenna branches are not constant, waste occurs in the determination of the transmission power. Further, when the calibration for compensating for the IQ imbalance is performed in a state in which the transmitting analog circuits and the receiving analog circuits of the respective antenna branches do not have a constant amplitude, the use of normal AGC or the like is prevented due to the loopback in the device. Therefore, the dynamic range is restricted (see earlier description).

Subsequently, with reference to an example of a method of performing the calibration by looping back a calibration signal in a communication device including three Antenna Branches 0 to 2, further consideration will be given to the gain calibration satisfying the first and second conditions described above.

With the use of transmission of Antenna Branch 0, respective signals received by Antennas 1 and 2 are monitored. Thereby, a gain LoopBackGain[0][1] of the loopback transfer function of a path from Antenna Branch 0 to Antenna Branch 1 and a gain LoopBackGain[0][2] of the loopback transfer function of a path from Antenna Branch 0 to Antenna Branch 2 are acquired.

Then, with the use of transmission of Antenna Branch 1, respective signals received by Antennas 0 and 2 are monitored. Thereby, a gain LoopBackGain[1][0] of the loopback transfer function of a path from Antenna Branch 1 to Antenna Branch 0 and a gain LoopBackGain[1][2] of the loopback transfer function of a path from Antenna Branch 1 to Antenna Branch 2 are acquired.

Then, on the basis of the ratio between LoopBackGain[0][1] and LoopBackGain[0][2], the ratio between a gain RxGain[1] of the receiving analog circuit of Antenna Branch 1 and a gain RxGain[2] of the receiving analog circuit of Antenna Branch 2 is calculated. Similarly, on the basis of the ratio between LoopBackGain[1][0] and LoopBackGain[1][2], the ratio between a gain RxGain[0] of the receiving analog circuit of Antenna Branch 0 and the gain RxGain[2] of the receiving analog circuit of Antenna Branch 2 is calculated. Accordingly, the ratio among RxGain[0], RxGain[1], and RxGain[2] is calculated.

Further, on the basis of LoopBackGain[1][0] and LoopBackGain[2][0], the ratio between a gain TxGain[1] of the transmitting analog circuit of Antenna Branch 1 and a gain TxGain[2] of the transmitting analog circuit of Antenna Branch 2 is calculated. Similarly, on the basis of LoopBackGain[0][1] and LoopBackGain[2][1], the ratio between a gain TxGain[0] of the transmitting analog circuit of Antenna Branch 0 and the gain TxGain[2] of the transmitting analog circuit of Antenna Branch 2 is calculated. Accordingly, the ratio among TxGain[0], TxGain[1], and TxGain[2] is calculated.

In the gain calibration method using the in-device loopback, however, a plurality of loopback paths to the respective branches are prepared in an RF analog circuit. Therefore, there is an issue of an increase in cost of the RF analog device. Further, the isolation among the antenna branches is reduced to approximately 20 dB. Therefore, there is a disadvantage of a decrease in the accuracy of the acquisition of the coefficients for the antenna calibration and the IQ calibration.

In view of the above, to improve the isolation among the antenna branches, the present inventors propose the acquisition of the gain LoopBackGain of the loopback transfer function between each two of the antenna branches not though the in-device loopback but through the inter-antenna loopback. Herein, if the inter-antenna loopback is performed, the spatial transfer function constitutes an uncertainty factor. Basically, however, the spatial transfer function can be corrected in accordance with the space propagation loss. That is, the space propagation loss between each two of the respective antennas (the space propagation loss between one antenna and another antenna) is previously stored in a table formed by a nonvolatile memory or the like, and the gain of each of the loopback transfer functions is calibrated with the use of the stored space propagation loss value. Then, on the basis of the calibrated gain of each of the loopback transfer functions, the gain ratio among the receiving analog circuits of the respective antenna branches and the gain ratio among the transmitting analog circuits of the respective antenna branches are calculated similarly as described above. Thereby, the gain calibration can be performed.

Further, switches are prepared for RF stages to enable the measurement of the propagation loss ratio among the antennas. Further, the propagation loss ratio among the antennas is stored in a table of a nonvolatile memory, for example. Thereby, the gain calibration can be performed, even if a user changes the inter-antenna distance.

FIG. 1 schematically illustrates a configuration of a wireless communication device achieving the above-described gain calibration. A wireless communication device 10 illustrated in the drawing includes an antenna unit 11 formed by a plurality of antenna elements for transmitting and receiving wireless signals, an analog processing unit 12 including transmitting analog circuits and receiving analog circuits corresponding to the respective antennas to process analog transmitting and received signals, and a digital processing unit 13 for processing digital transmitting and received signals.

Figure 2:
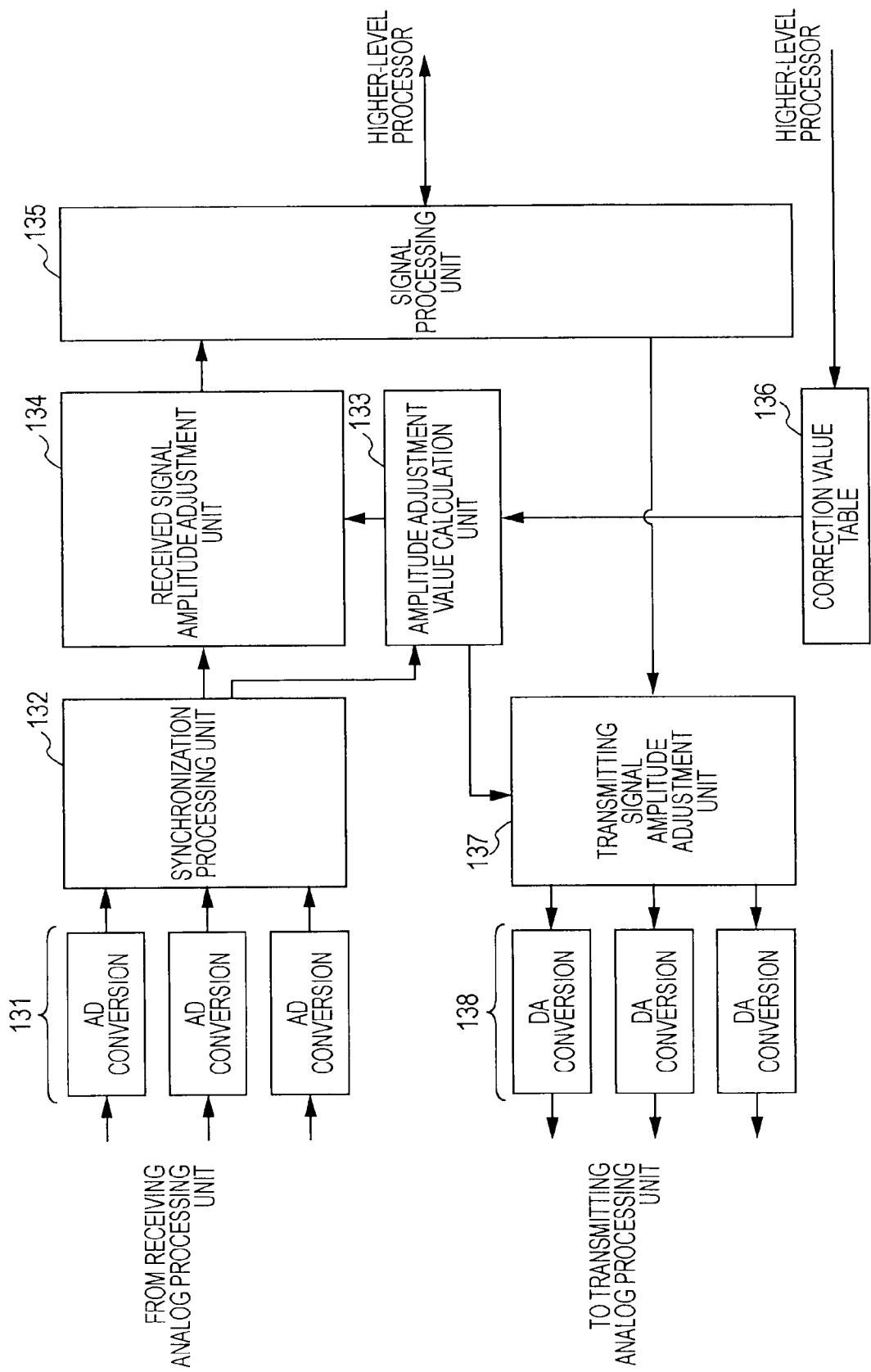
FIG. 2 is a diagram illustrating an internal configuration of a digital processing unit of the wireless communication device illustrated in FIG. 1.

Further, FIG. 2 illustrates an internal configuration of the digital processing unit 13.

A reception system of the digital processing unit 13 includes an AD (Analog-to Digital) conversion unit 131, a synchronization processing unit 132, an amplitude adjustment value calculation unit 133, and a received signal amplitude adjustment unit 134. The AD conversion unit 131 converts each of the received analog signals of the respective antenna branches into a digital value. The synchronization processing unit 132 performs such processes as packet detection, timing detection, frequency offset correction, and noise estimation. The amplitude adjustment value calculation unit 133 calculates the amplitude adjustment value from an amplitude signal obtained from a digital received signal (calibration signal) subjected to the synchronization processing. With the use of the obtained amplitude adjustment value, the received signal amplitude adjustment unit 134 adjusts the variation in amplitude of the digital received signal of each of the antenna branches subjected to the synchronization processing.

A signal processing unit 135 performs the antenna calibration and the IQ calibration, in addition to the demodulation process of the received signals and the modulation process of the transmitting signals, which are performed in normal wireless communication. The antenna calibration and the IQ calibration can be performed by the already described methods. Thus, the description thereof will be omitted. The gist of the present invention, however, is not limited to any particular antenna calibration method and IQ calibration method.

Meanwhile, a transmission system of the digital processing unit 13 includes a transmitting signal amplitude adjustment unit 137 for adjusting the variation in amplitude of the modulated digital transmitting signal of each of the antenna branches, and a DA (Digital-to-Analog) conversion unit 138 for converting the digital signal into an analog signal.

In the present embodiment, the wireless communication device 10 acquires the gains of the loopback transfer functions between the antenna branches through the inter-antenna loopback. The amplitude adjustment value calculation unit 133 calculates the amplitude adjustment value by using the gain of each of the loopback transfer functions. If the inter-antenna loopback is performed, the spatial transfer function constitutes an uncertainty factor. However, a correction table 136 stores free-space propagation losses between the respective antennas, and the amplitude adjustment value calculation unit 133 calibrates the gains of the respective loopback transfer functions by using the stored free-space propagation losses.

Figure 3:
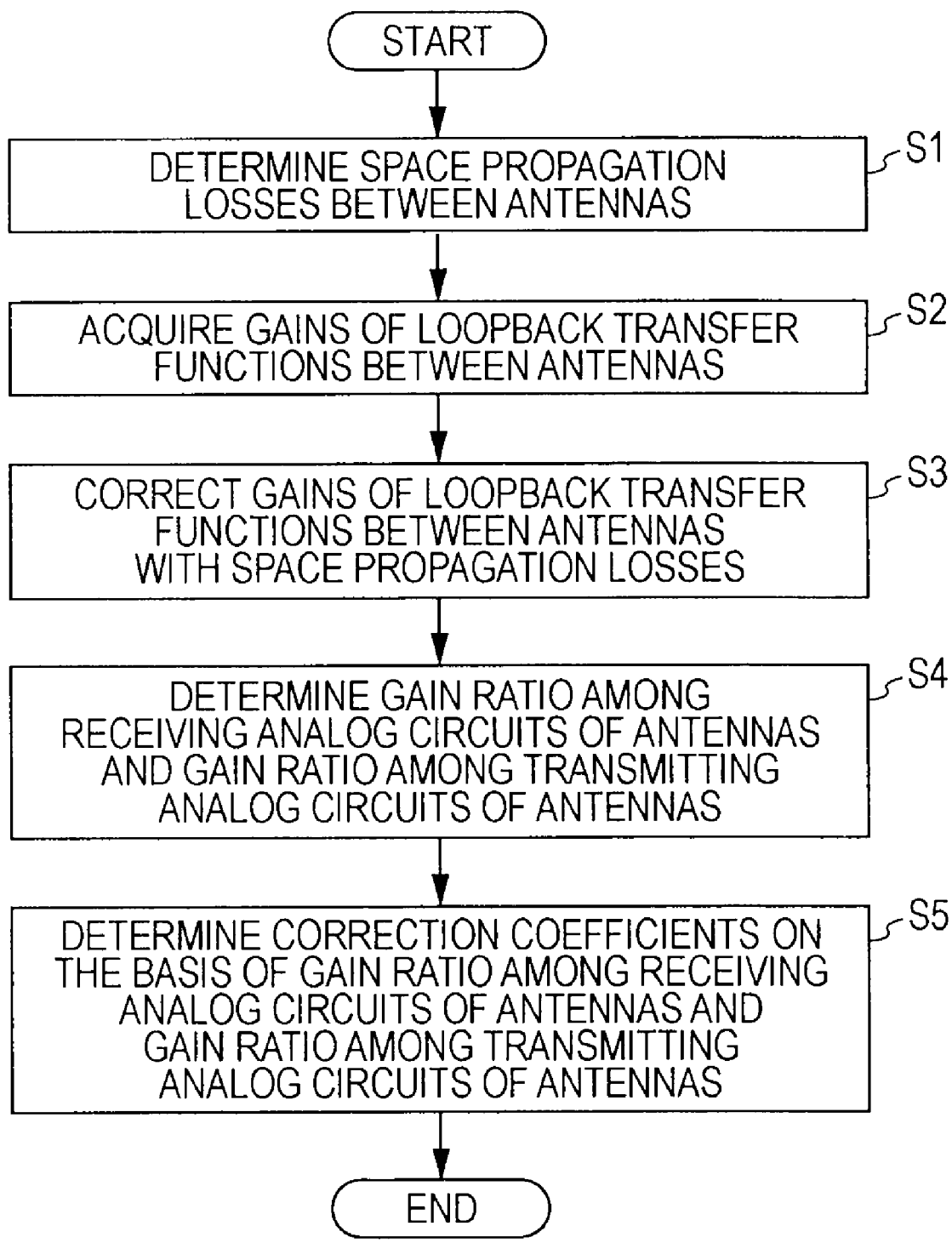
FIG. 3 is a flowchart illustrating a processing procedure for determining correction coefficients for performing gain calibration on digital received signals and digital transmitting signals corresponding to respective antennas.

Subsequently, with reference to FIG. 3, description will be made of a processing procedure in which the amplitude adjustment value calculation unit 133 determines, with the use of the correction value table 136, the correction coefficients for performing the gain calibration on the digital received signals and the digital transmitting signals corresponding to the respective antennas.

Step 1: The correction values for correcting the spatial transfer functions between the antennas of the antenna unit 11 are first determined to be stored in the correction value table 136.

When the wavelength of the used radio waves is represented as $\lambda$, and the inter-antenna distance is represented as d, the free-space propagation loss L can be calculated from the following formula (5) (see Page 29 of "Wireless Communication Engineering" published by Corona Publishing Co., Ltd., for example). In the following description, the propagation losses and the gains will be logarithmically represented.

Formula 5

$$L = 20\log_{10}(4.0 \times \pi \times d/\lambda)[\text{dB}] \qquad (5)$$

Herein, the space propagation loss in the propagation from an antenna j to an antenna i is represented as A[i][j]. Then, an equation A[i][j]=A[j][i] holds. In the following description, for simplification thereof, the free-space propagation losses between the respective antennas will be represented as follows on the basis of the assumption that the antenna unit 11 includes three antenna elements, i.e., Antennas 0 to 2.

A[0][1] represents the propagation loss [dB] between Antenna 0 and Antenna 1. A[0][2] represents the propagation loss [dB] between Antenna 0 and Antenna 2. A[1][2] represents the propagation loss [dB] between Antenna 1 and Antenna 2.

Figure 4:
FIG. 4 is a diagram illustrating an arrangement example of three antenna elements, more specifically a diagram illustrating three antennas arranged on a straight line.
Figure 4:
Figure 4:
Figure 5:
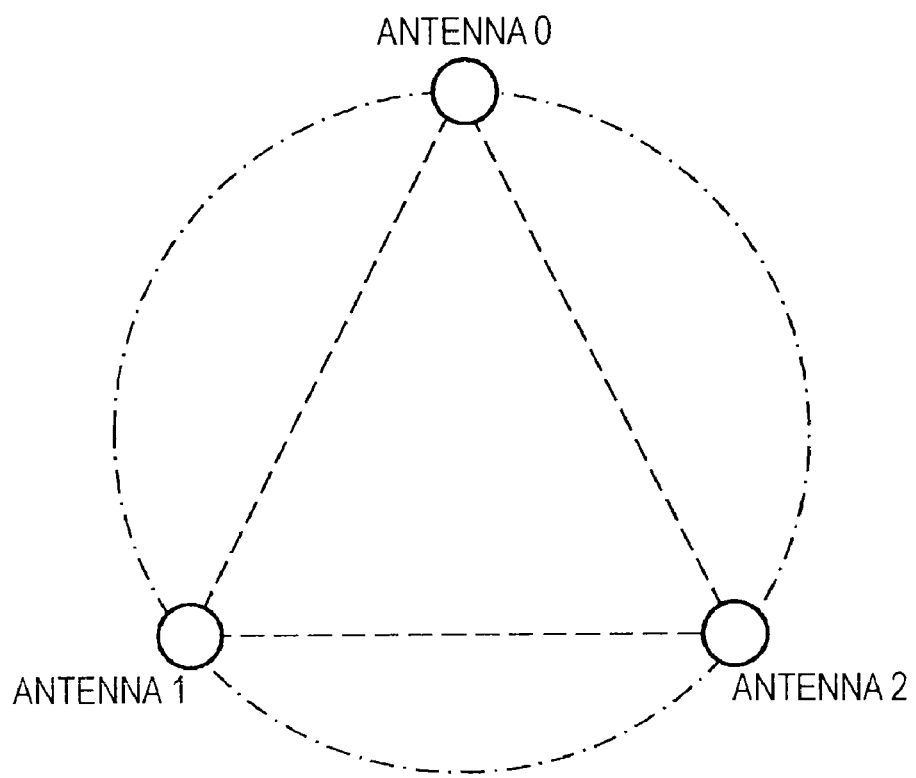
FIG. 5 is a diagram illustrating an arrangement example of three antenna elements, more specifically a diagram illustrating three antennas arranged at substantially equal intervals in a regular triangle shape (or on the circumference of a circle)

If the three antenna elements are arranged on a straight line, as illustrated in FIG. 4, the loss A[0][2] between Antenna 0 and Antenna 2 is greater than the loss A[0][1] between Antenna 0 and Antenna 1. Meanwhile, if the three antenna elements are arranged at substantially equal intervals in a regular triangle shape (or on the circumference of a circle), as illustrated in FIG. 5, the relationship A[0][1]≈A[0][2]≈A[1][2] is established.

The above-described propagation loss value A[i][j] between each two of the antennas is acquired by one of a first method of determining the value in accordance with the above-described formula (5) representing the free-space propagation loss, a second method of previously measuring the value by using a measuring device such as a spectrum analyzer, and a third method of arranging the antennas not on a straight line (see FIG. 4) but in such a manner that all inter-antenna intervals are equal (see FIG. 5) to equalize the space losses between the antennas.

The propagation loss value A[i][j] between each two of the antennas acquired by one of the first to third methods described above or by still another method is previously stored in the correction value table 136.

Step 2: Then, through the loopback of a known calibration signal between the respective antennas, the amplitude adjustment value calculation unit 133 acquires the amplitude signals, i.e., the gains of the loopback transfer functions between the respective antenna branches.

Figure 6:
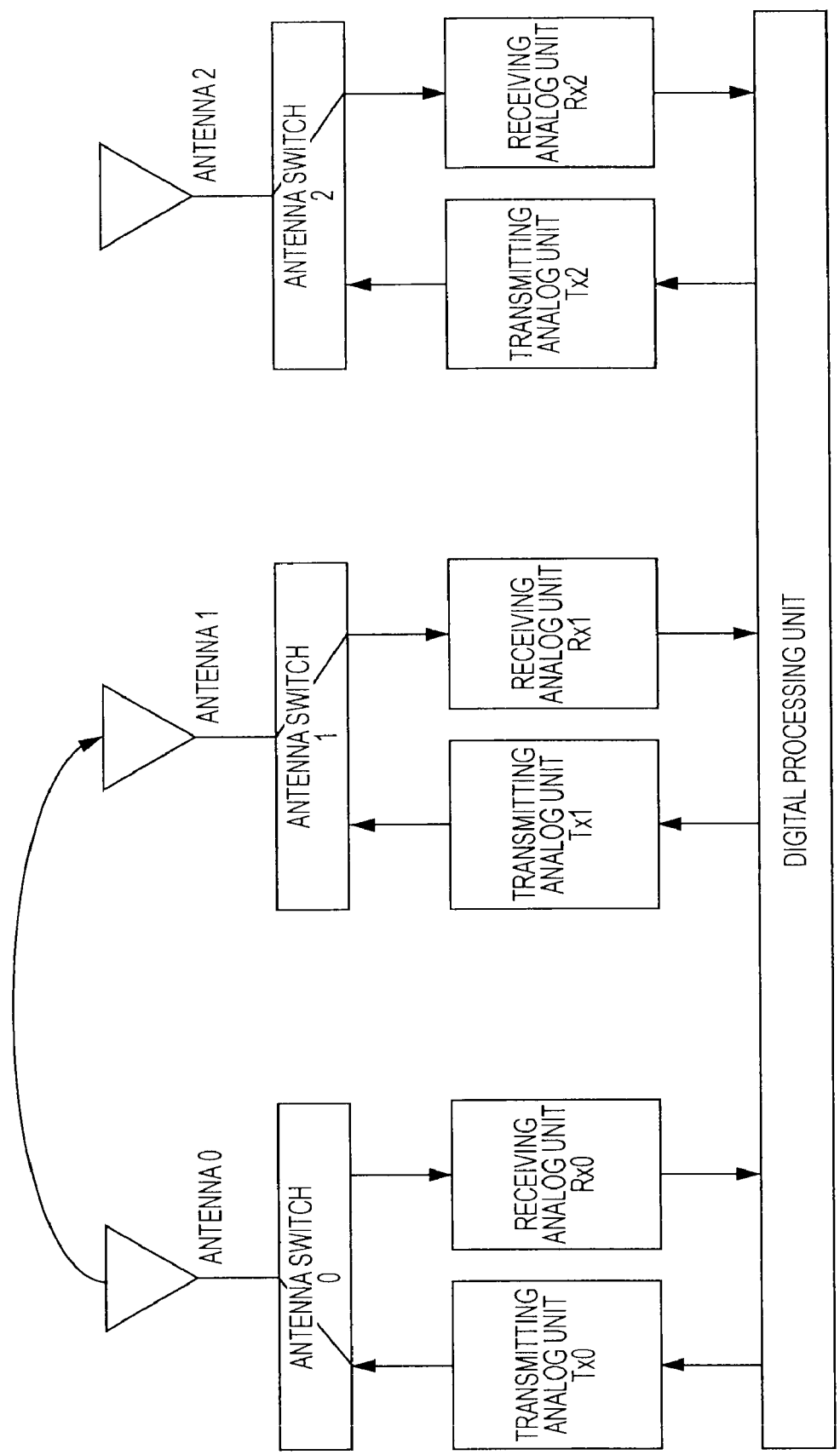
FIG. 6 is a diagram illustrating loopback of a calibration signal to a second antenna, with the transmission from a first antenna used as a reference.
Figure 7:
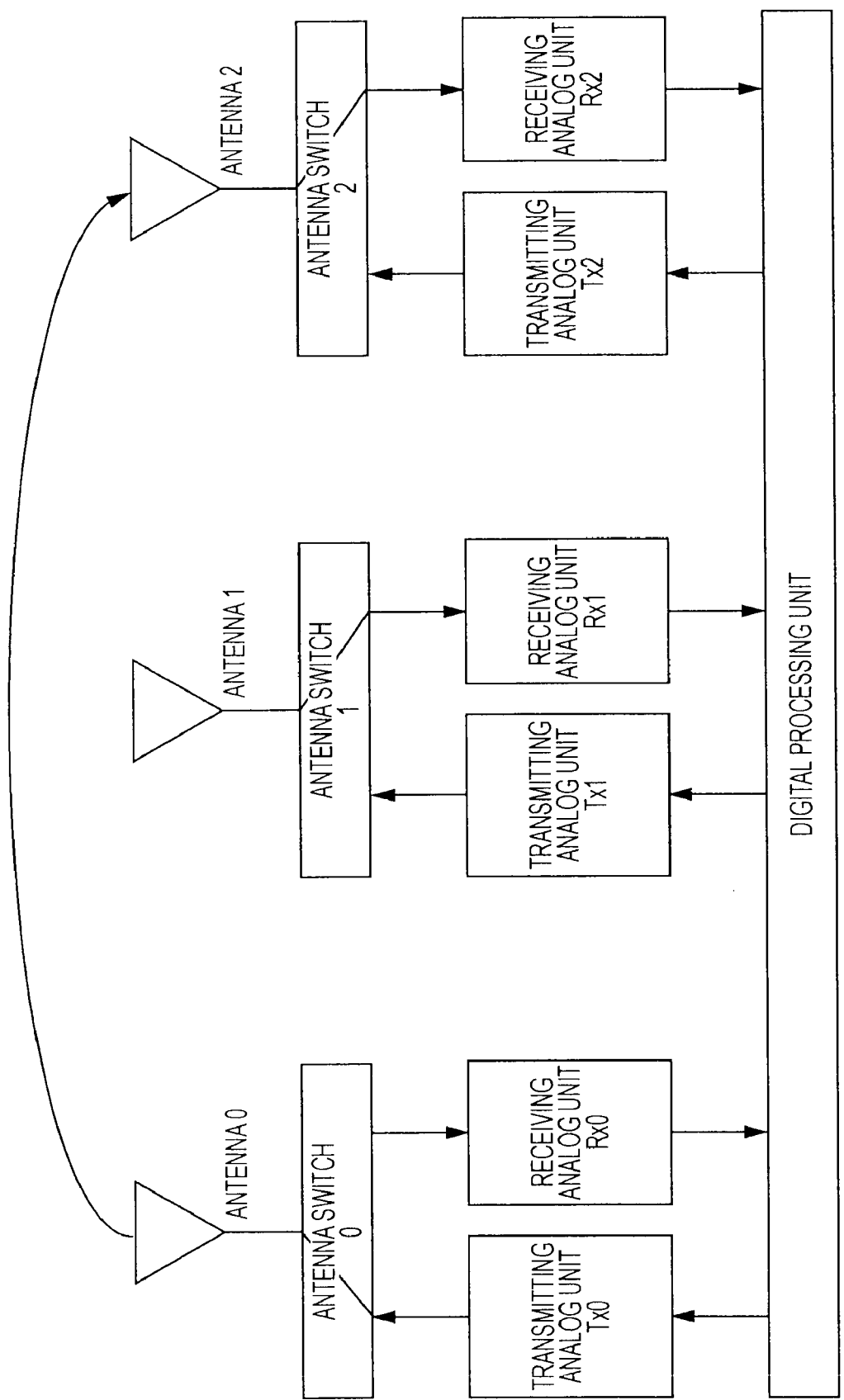
FIG. 7 is a diagram illustrating loopback of a calibration signal to a third antenna, with the transmission from the first antenna used as a reference.
Figure 8:
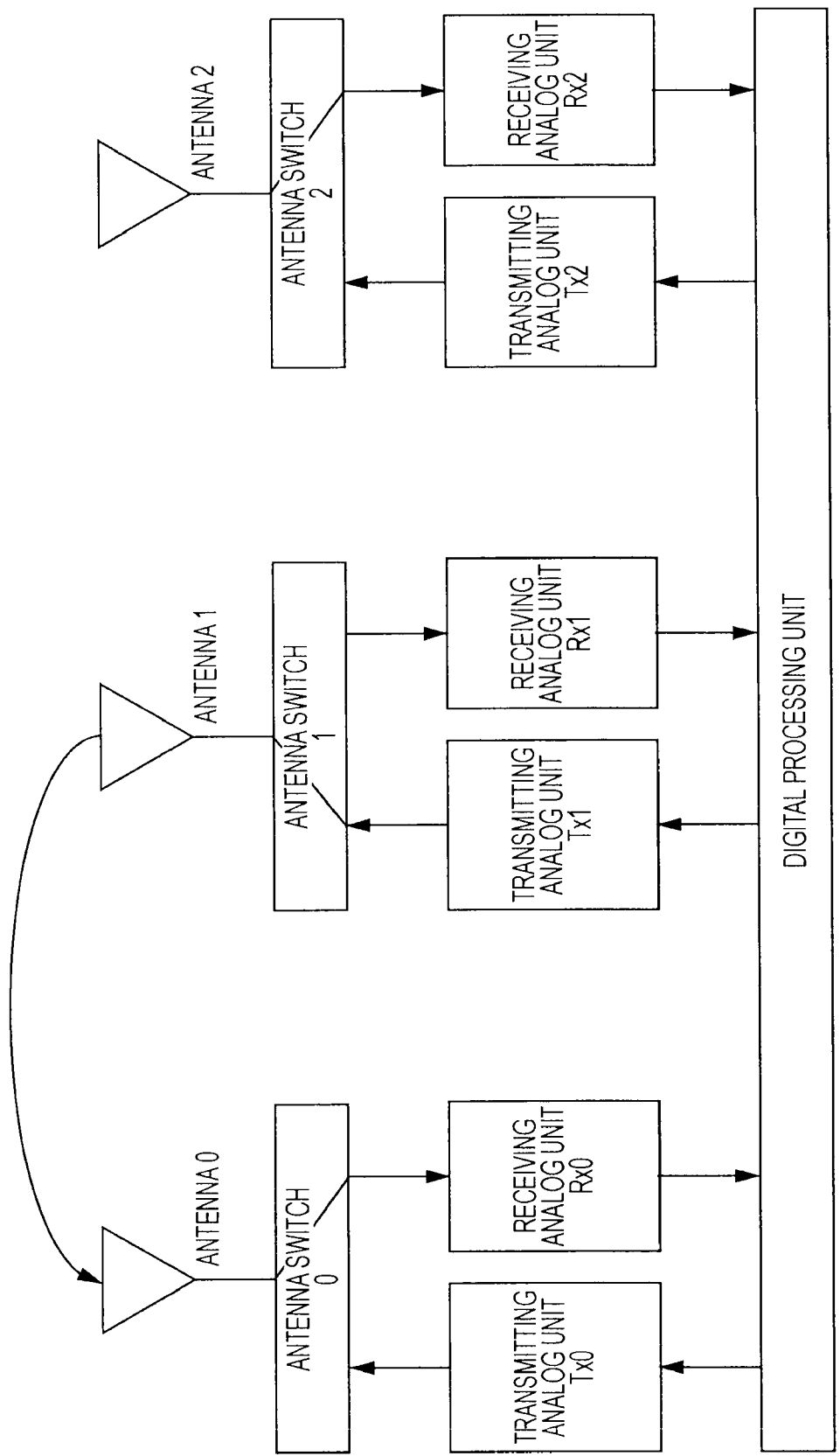
FIG. 8 is a diagram illustrating loopback of a calibration signal to the first antenna, with the transmission from the second antenna used as a reference.
Figure 9:
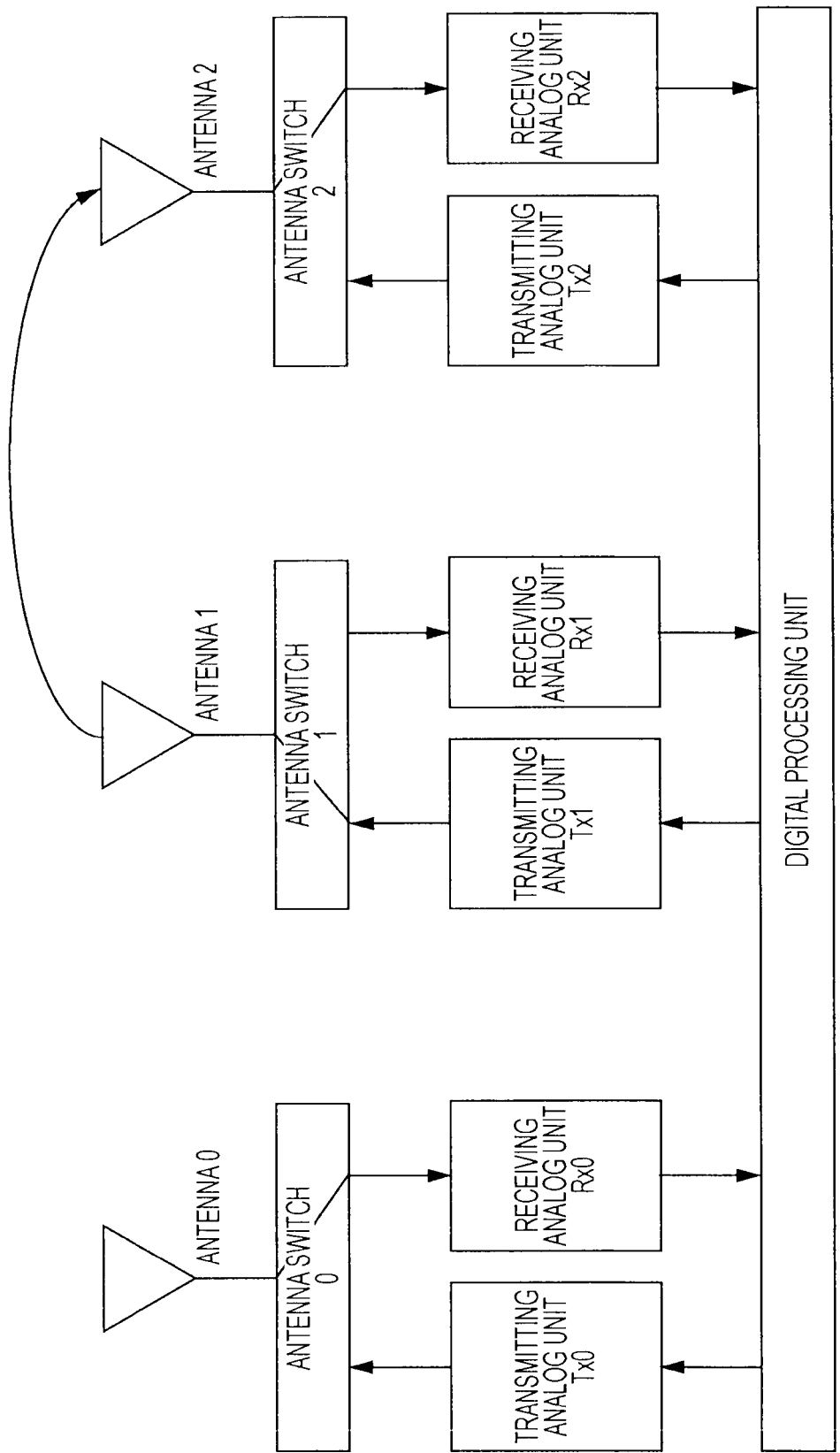
FIG. 9 is a diagram illustrating loopback of a calibration signal to the third antenna, with the transmission from the second antenna used as a reference.
Figure 10:
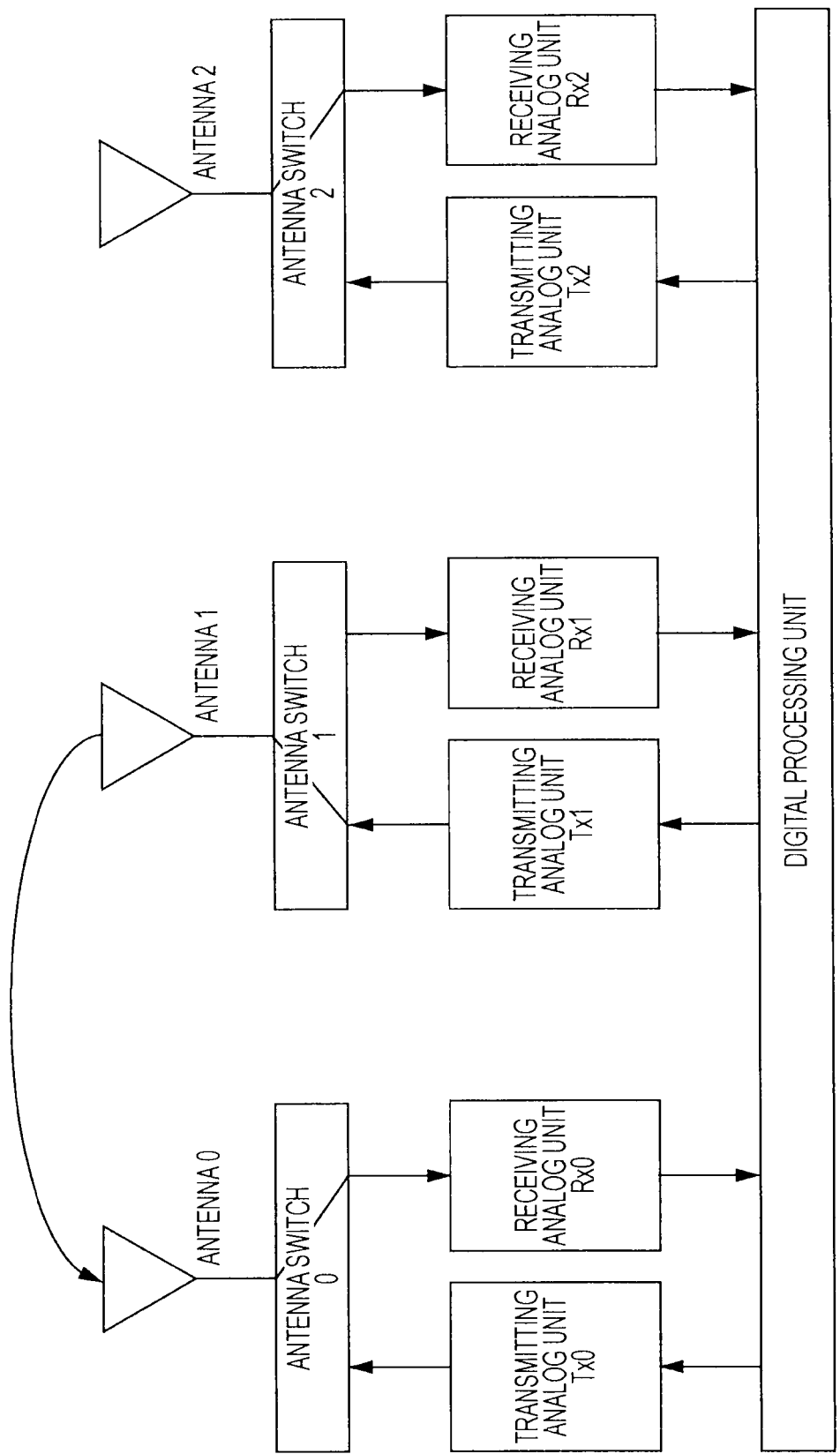
FIG. 10 is a diagram illustrating loopback of a calibration signal from the second antenna, with the reception by the first antenna used as a reference.
Figure 11:
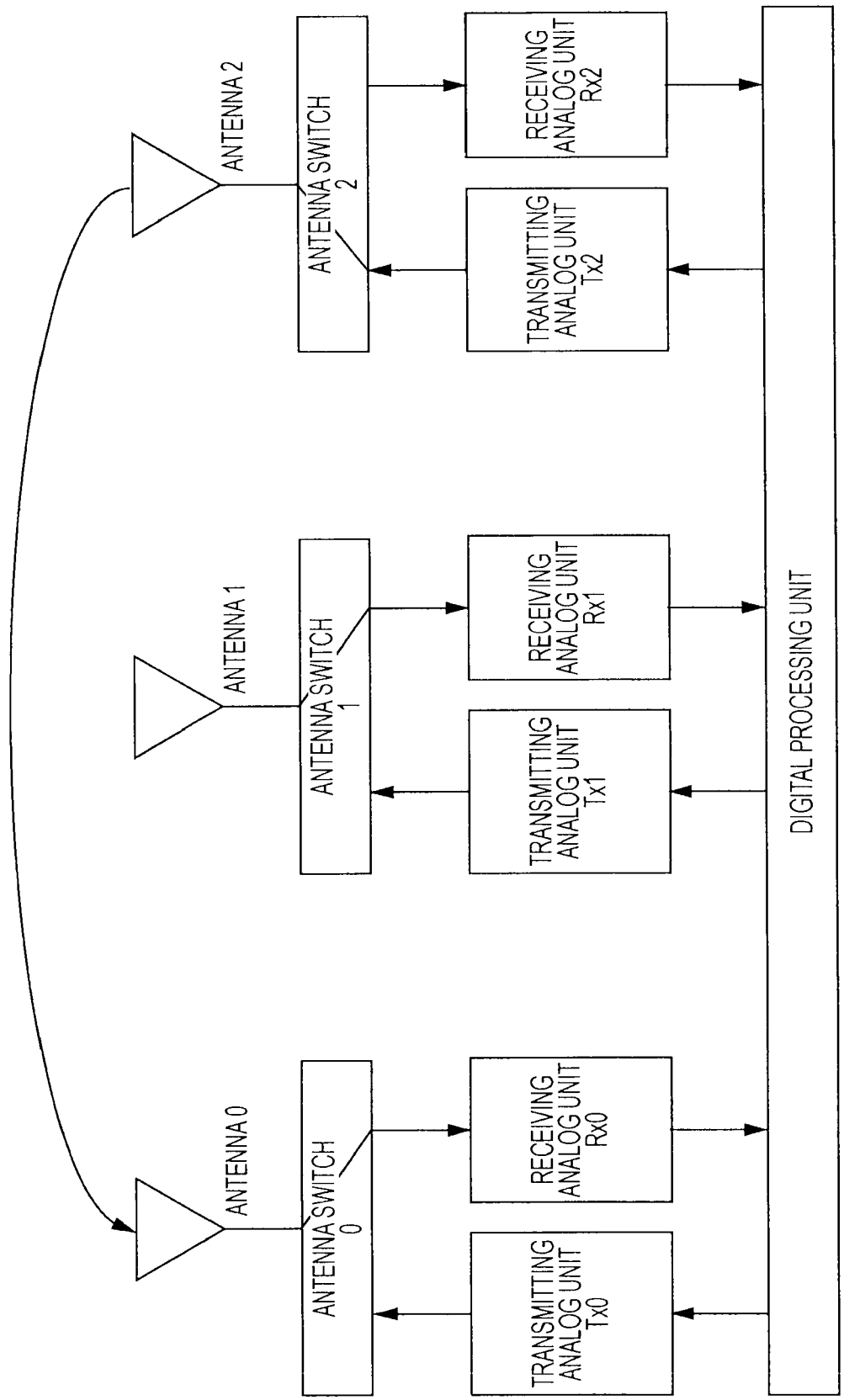
FIG. 11 is a diagram illustrating loopback of a calibration signal from the third antenna, with the reception by the first antenna used as a reference.
Figure 12:
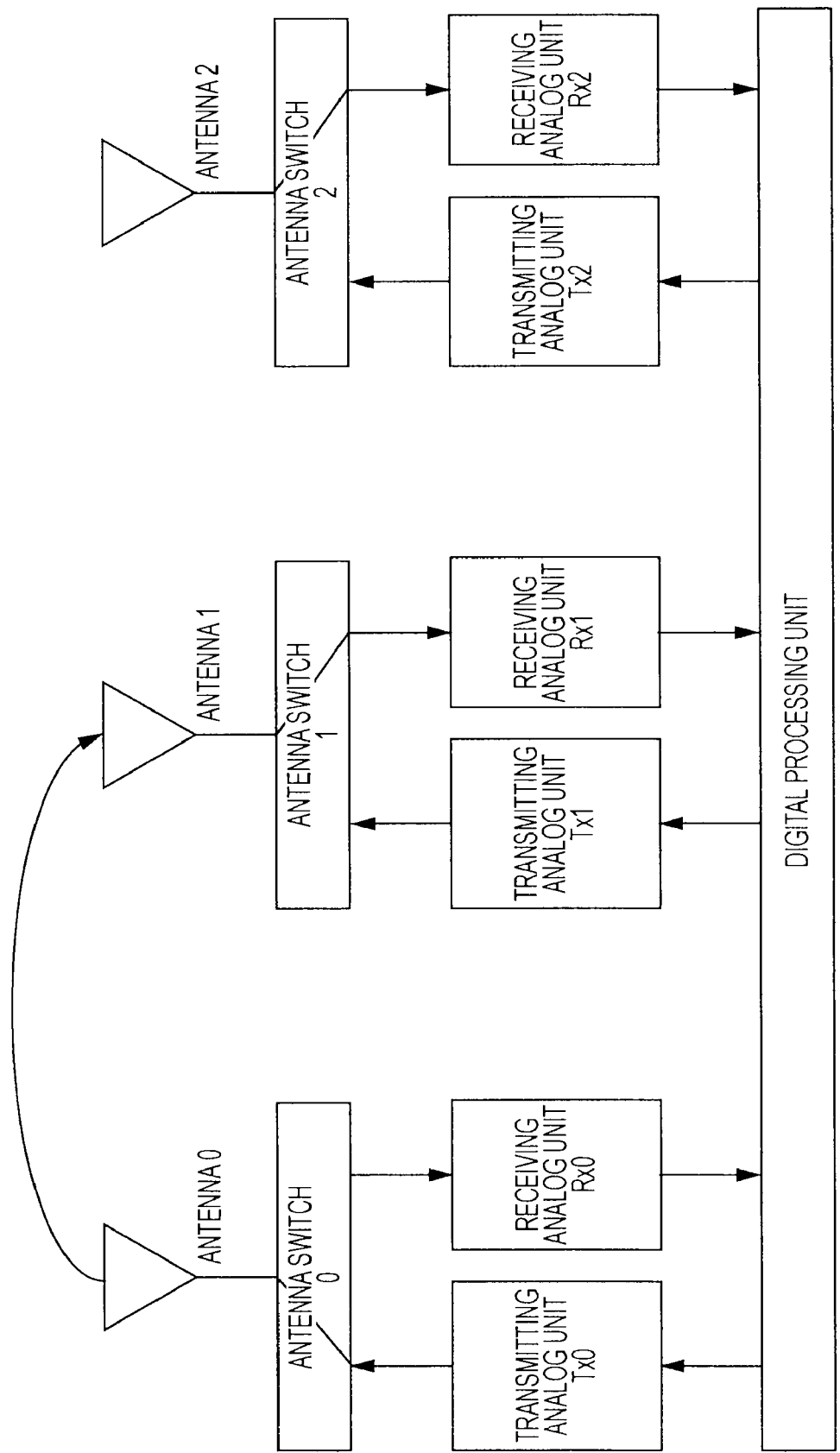
FIG. 12 is a diagram illustrating loopback of a calibration signal from the first antenna, with the reception by the second antenna used as a reference.
Figure 13:
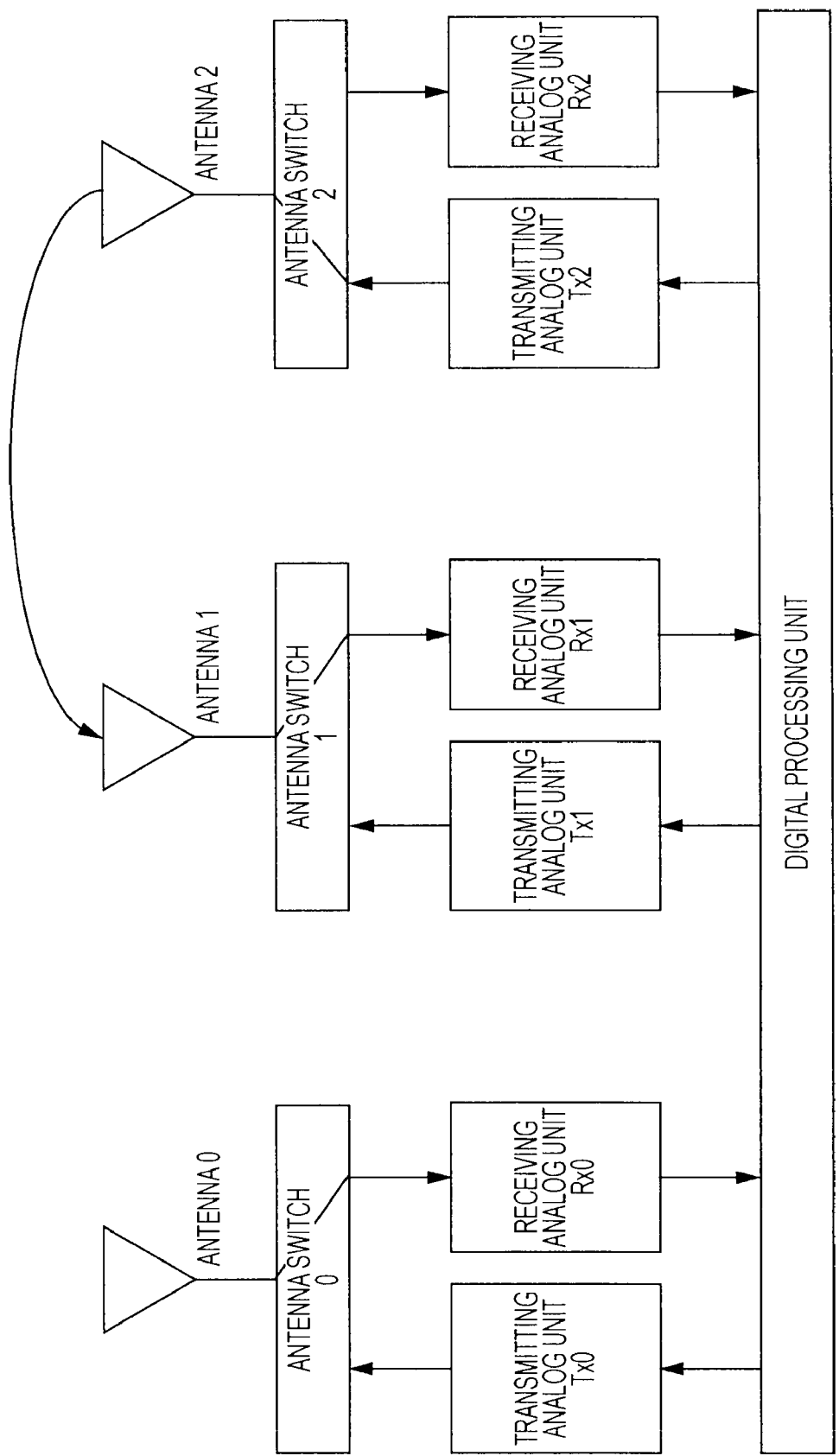
FIG. 13 is a diagram illustrating loopback of a calibration signal from the third antenna, with the reception by the second antenna used as a reference.

Specifically, the amplitude adjustment value calculation unit 133 acquires the gains of the loopback transfer functions in the respective receptions by Antennas 1 and 2 with the transmission from Antenna 0 used as a reference (see FIGS. 6 and 7), the gains of the loopback transfer functions in the respective receptions by Antennas 0 and 2 with the transmission from Antenna 1 used as a reference (see FIGS. 8 and 9), the gains of the loopback transfer functions in the respective transmissions from Antennas 1 and 2 with the reception by Antenna 0 used as a reference (see FIGS. 10 and 11), and the gains of the loopback transfer functions in the respective transmissions from Antennas 0 and 2 with the reception by Antenna 1 used as a reference (see FIGS. 12 and 13).

When the gain of the loopback transfer function acquired in the transmission from an antenna j and the reception by an antenna i is represented as D[i][j], the following gains of the loopback transfer functions are acquired at the present step.

D[1][0] represents the gain [dB] of the transfer function acquired in the reception by Antenna 1, with the transmission from Antenna 0 used as a reference. D[2][0] represents the gain [dB] of the transfer function acquired in the reception by Antenna 2, with the transmission from Antenna 0 used as a reference.

D[0][1] represents the gain [dB] of the transfer function acquired in the reception by Antenna 0, with the transmission from Antenna 1 used as a reference. D[2][1] represents the gain [dB] of the transfer function acquired in the reception by Antenna 2, with the transmission from Antenna 1 used as a reference.

D[0][1] represents the gain [dB] of the transfer function acquired in the transmission from Antenna 1, with the reception by Antenna 0 used as a reference. D[0][2] represents the gain [dB] of the transfer function acquired in the transmission from Antenna 2, with the reception by Antenna 0 used as a reference.

D[1][0] represents the gain [dB] of the transfer function acquired in the transmission from Antenna 0, with the reception by Antenna 1 used as a reference. D[1][2] represents the gain [dB] of the transfer function acquired in the transmission from Antenna 2, with the reception by Antenna 1 used as a reference.

Step 3: Then, in accordance with the correction value A[i][j] of the spatial transfer function between each two of the antennas stored in the correction value table 136, the amplitude adjustment value calculation unit 133 corrects the amplitude signal acquired at Step 3, i.e., the gain D[i][j] of the loopback transfer function between each two of the antenna branches. When the gain of the loopback transfer function including the correction value for correcting the gain difference among the antennas is represented as X[i][j], X[i][j] is expressed by the following formula (6).

Formula 6

$$X[i][j] = D[i][j] + A[i][j] \quad (6)$$

Step 4: Then, the amplitude adjustment value calculation unit 133 determines the gain ratio among the receiving analog circuits of the respective antenna branches and the gain ratio among the transmitting analog circuits of the respective antenna branches.

Specifically, on the basis of four sets of information X[1][0], X[2][0], X[0][1], and X[2][1], which are the gains of the respective loopback transfer functions subjected to the correction at Step 3, the amplitude adjustment value calculation unit 133 calculates the gain ratio among the receiving analog circuits of Antenna Branches 0 to 2. The gain of the receiving analog circuit 0, the gain of the receiving analog circuit 1, and the gain of the receiving analog circuit 2 are represented as follows.

Formula 7

$$X[2][0] + (X[0][1] - X[2][1]) : X[1][0] : X[2][0] \quad (7)$$

Further, on the basis of four sets of information X[0][1], X[0][2], X[1][0], and X[1][2], which are the gains of the respective loopback transfer functions subjected to the correction at Step 3, the amplitude adjustment value calculation unit 133 calculates the transmission gain ratio. The gain of the transmitting analog circuit 0, the gain of the transmitting analog circuit 1, and the gain of the transmitting analog circuit 2 are represented as follows.

Formula 8

$$X[0][2] + (X[1][0] - X[1][2]) : X[0][1] : X[0][2] \quad (8)$$

Step 5: Then, on the basis of the gain ratio among the receiving analog circuits of the respective antenna branches and the gain ratio among the transmitting analog circuits of the respective antenna branches, which have been determined at Step 4, the amplitude adjustment value calculation unit 133 determines the correction coefficients for performing the gain calibration on the digital received signals and the digital transmitting signals of the respective antenna branches.

The gain ratio among the gain of the receiving analog circuit 0, the gain of the receiving analog circuit 1, and the gain of the receiving analog circuit 2 calculated at Step 4 (see the above formula (7)) is represented as Z_Rx0:Z_Rx1:Z_Rx2. Then, the maximum value is determined from Z_Rx0, Z_Rx1, and Z_Rx2 in the gain ratio among the receiving analog circuits of the respective antenna branches. The maximum value is represented as Max_Z_Rx. Then, the respective correction coefficient values for performing the gain calibration (amplitude adjustment) on the digital received signals of the respective antenna branches can be calculated as follows. If the maximum value Max_Z_Rx is 2 dB, for example, the use of the following correction coefficients corresponds to the correction for increasing the main signal by 2 dB.

Formula 9

$$\text{Correction Coefficient for Receiving Branch } 0 = \text{Max}\_Z\_Rx - Z\_Rx0$$

$$\text{Correction Coefficient for Receiving Branch } 1 = \text{Max}\_Z\_Rx - Z\_Rx1$$

$$\text{Correction Coefficient for Receiving Branch } 2 = \text{Max}\_Z\_Rx - Z\_Rx2 \quad (9)$$

With the use of the correction coefficients for the respective antennas shown in the above formula (9), the received signal amplitude adjustment unit 134 can perform the gain calibration on the digital received signals of the respective antenna branches.

Further, the gain ratio among the gain of the transmitting analog circuit 0, the gain of the transmitting analog circuit 1, and the gain of the transmitting analog circuit 2 calculated at Step 4 (see the above formula (8)) is represented as $Z\_Tx0:Z\_Tx1:Z\_Tx2$. Then, the maximum value is determined from $Z\_Tx0$, $Z\_Tx1$, and $Z\_Tx2$ in the gain ratio among the transmitting analog circuits of the respective antenna branches. The maximum value is represented as $\text{Max}\_Z\_Tx$. Then, the respective correction coefficient values for performing the gain calibration (amplitude adjustment) on the digital transmitting signals of the respective antenna branches can be calculated as follows.

Formula 10

$$\text{Correction Coefficient for Transmitting Branch } 0 = \text{Max}\_Z\_Tx - Z\_Tx0$$

$$\text{Correction Coefficient for Transmitting Branch } 1 = \text{Max}\_Z\_Tx - Z\_Tx1$$

$$\text{Correction Coefficient for Transmitting Branch } 2 = \text{Max}\_Z\_Tx - Z\_Tx2 \quad (10)$$

With the use of the correction coefficients for the respective antennas shown in the above formula (10), the transmitting signal amplitude adjustment unit 137 can perform the gain calibration on the digital transmitting signals of the respective antenna branches.

The present application contains subject matter related to that disclosed in Japanese Priority Patent Application JP 2008-195886 filed in the Japan Patent Office on Jul. 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication device comprising:
   an antenna unit including a plurality of antennas for transmitting and receiving wireless signals;
   an analog processing unit including receiving analog circuits and transmitting analog circuits corresponding to the respective plurality of antennas, the analog processing unit configured to process analog transmitting and received signals;
   a digital processing unit configured to process digital transmitting and received signals corresponding to the respective plurality of antennas;
   inter-antenna propagation loss determination means for determining propagation losses along transmission paths between the respective antennas of the wireless communication device;
   loopback transfer function gain acquisition means for acquiring, through loopback of a calibration signal between the respective antennas, gains of loopback transfer functions between respective antenna branches;
   loopback transfer function gain correction means for correcting, on the basis of the propagation losses between the respective antenna branches determined by the inter-antenna propagation loss determination means, the acquired gains of the loopback transfer functions between the respective antenna branches;
   correction coefficient determination means for determining, using the gains of the loopback transfer functions between the respective antenna branches corrected by the loopback transfer function gain correction means, a gain ratio among the receiving analog circuits of the respective antenna branches and a gain ratio among the transmitting analog circuits of the respective antenna branches, and determining, on the basis of the gain ratios, correction coefficients for performing gain calibration on the digital transmitting and received signals corresponding to the respective plurality of antennas; and
   gain calibration processing means for performing, using the correction coefficients for the respective antennas determined by the correction coefficient determination means, the gain calibration on the digital transmitting and received signals corresponding to the respective plurality of antennas.

2. The wireless communication device according to claim 1,
   wherein the inter-antenna propagation loss determination means determines the propagation losses between the respective antennas on the basis of free-space propagation losses according to the distances between the respective antennas.

3. The wireless communication device according to claim 1,
   wherein the inter-antenna propagation loss determination means determines the propagation losses between the respective antennas on the basis of the result of measurement using a measuring device.

4. The wireless communication device according to claim 1,
   wherein the inter-antenna propagation loss determination means determines the propagation losses between the respective antennas to be equal by having respective antenna elements arranged at equal distances from one another.

5. The wireless communication device according to claim 1,
   wherein the antenna unit includes three or more antennas, and
   wherein the loopback transfer function gain acquisition means acquires the gains of the loopback transfer functions in the respective receptions by the antennas other than a first antenna with the transmission from the first antenna used as a reference, the gains of the loopback transfer functions in the respective receptions by the antennas other than a second antenna different from the first antenna with the transmission from the second antenna used as a reference, the gains of the loopback transfer functions in the respective transmissions from the antennas other than the first antenna with the reception by the first antenna used as a reference, and the gains of the loopback transfer functions in the respective transmissions from the antennas other than the second antenna different from the first antenna with the reception by the second antenna used as a reference.

6. The wireless communication device according to claim 1,
wherein the correction coefficient determination means determines the maximum value from the gain ratio among the receiving analog circuits of the respective antenna branches, and determines a value resulting from subtraction of the gain of each of the receiving analog circuits from the maximum value to be the correction coefficient for the digital received signal of the corresponding antenna branch, and
wherein the correction coefficient determination means determines the maximum value from the gain ratio among the transmitting analog circuits of the respective antenna branches, and determines a value resulting from subtraction of the gain of each of the transmitting analog circuits from the maximum value to be the correction coefficient for the digital transmitting signal of the corresponding antenna branch.

7. A wireless commutation method of a wireless commutation device,
the wireless commutation device including
an antenna unit configured to include a plurality of antennas for transmitting and receiving wireless signals,
an analog processing unit including receiving analog circuits and transmitting analog circuits corresponding to the respective plurality of antennas, the analog processing unit configured to process analog transmitting and received signals, and
a digital processing unit configured to process digital transmitting and received signals corresponding to the respective plurality of antennas, the wireless communication method comprising the steps of:
determining propagation losses along transmission paths between the respective antennas of the wireless communication device;
acquiring, through loopback of a calibration signal between the respective antennas, gains of loopback transfer functions between respective antenna branches;
correcting, on the basis of the propagation losses between the respective antenna branches determined at the step of determining the propagation losses between the antennas, the acquired gains of the loopback transfer functions between the respective antenna branches;
determining, using the gains of the loopback transfer functions between respective antenna branches corrected at the step of correcting the gains of the loopback transfer functions, a gain ratio among the receiving analog circuits of the respective antenna branches and a gain ratio among the transmitting analog circuits of the respective antenna branches, and determining, on the basis of the gain ratios, correction coefficients for performing gain calibration on the digital transmitting and received signals corresponding to the respective plurality of antennas; and
performing, using the correction coefficients for the respective antennas determined at the step of determining the correction coefficients, the gain calibration on the digital transmitting and received signals corresponding to the respective plurality of antennas.

8. A non-transitory computer readable storage medium having instructions stored therein, which when executed by a processor in a wireless communication device causes the processor to execute a method for adjusting the amplitudes of transmitting and received signals among respective antenna branches in a wireless commutation device,
the wireless commutation device including
an antenna unit including a plurality of antennas for transmitting and receiving wireless signals,
an analog processing unit including receiving analog circuits and transmitting analog circuits corresponding to the respective plurality of antennas, the analog processing unit configured to process analog transmitting and received signals, and
a digital processing unit configured to process digital transmitting and received signals corresponding to the respective plurality of antennas, the method comprising:
determining propagation losses along transmission paths between the respective antennas of the wireless communication device;
acquiring, through loopback of a calibration signal between the respective antennas, gains of loopback transfer functions between the respective antenna branches;
correcting, on the basis of the determined propagation losses between the respective antenna branches, the acquired gains of the loopback transfer functions between the respective antenna branches;
determining, using the gains of the loopback transfer functions between the respective antenna branches, a gain ratio among the receiving analog circuits of the respective antenna branches and a gain ratio among the transmitting analog circuits of the respective antenna branches, and determining, on the basis of the gain ratios, correction coefficients for performing gain calibration on the digital transmitting and received signals corresponding to the respective plurality of antennas; and
performing, using the correction coefficients for the respective antennas, the gain calibration on the digital transmitting and received signals corresponding to the respective plurality of antennas.

9. A wireless communication device comprising:
an antenna unit configured to include a plurality of antennas for transmitting and receiving wireless signals;
an analog processing unit configured to include receiving analog circuits and transmitting analog circuits corresponding to the respective plurality of antennas, and to process analog transmitting and received signals;
a digital processing unit configured to process digital transmitting and received signals corresponding to the respective plurality of antennas;
an inter-antenna propagation loss determination unit configured to determine propagation losses along transmission paths between the respective antennas of the wireless communication device;
a loopback transfer function gain acquisition unit configured to acquire, through loopback of a calibration signal between the respective antennas, gains of loopback transfer functions between respective antenna branches;
a loopback transfer function gain correction unit configured to correct, on the basis of the propagation losses between the respective antenna branches determined by the inter-antenna propagation loss determination unit, the acquired gains of the loopback transfer functions between the respective antenna branches;
a correction coefficient determination unit configured to determine, using the gains of the loopback transfer functions between the respective antenna branches corrected by the loopback transfer function gain correction unit, a gain ratio among the receiving analog circuits of the respective antenna branches and a gain ratio among the transmitting analog circuits of the respective antenna branches, and to determine, on the basis of the gain ratios, correction coefficients for performing gain calibration on the digital transmitting and received signals corresponding to the respective plurality of antennas; and a gain calibration processing unit configured to perform, with the use of using the correction coefficients for the respective antennas determined by the correction coefficient determination unit, the gain calibration on the digital transmitting and received signals corresponding to the respective plurality of antennas.

* * * * *